Feb. 5, 1946. M. A. ZIMMERMAN 2,394,133
APPARATUS FOR RECTIFICATION, ABSORPTION, OR GAS SCRUBBING
Filed March 8, 1944 2 Sheets-Sheet 1
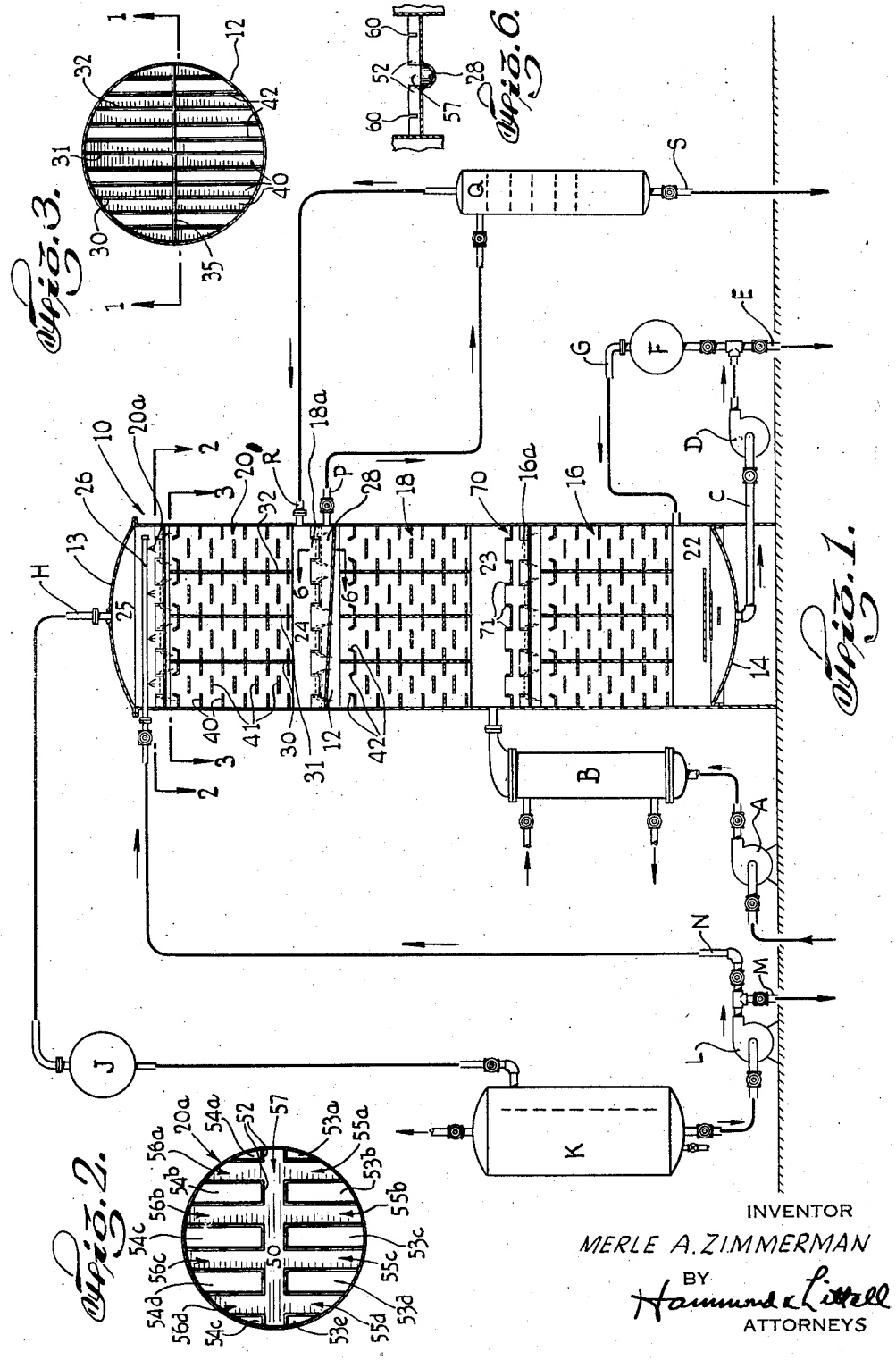
INVENTOR
MERLE A. ZIMMERMAN
BY
Hammond & Littell
ATTORNEYS Feb. 5, 1946. M. A. ZIMMERMAN 2,394,133
APPARATUS FOR RECTIFICATION, ABSORPTION, OR GAS SCRUBBING
Filed March 8, 1944 2 Sheets-Sheet 2
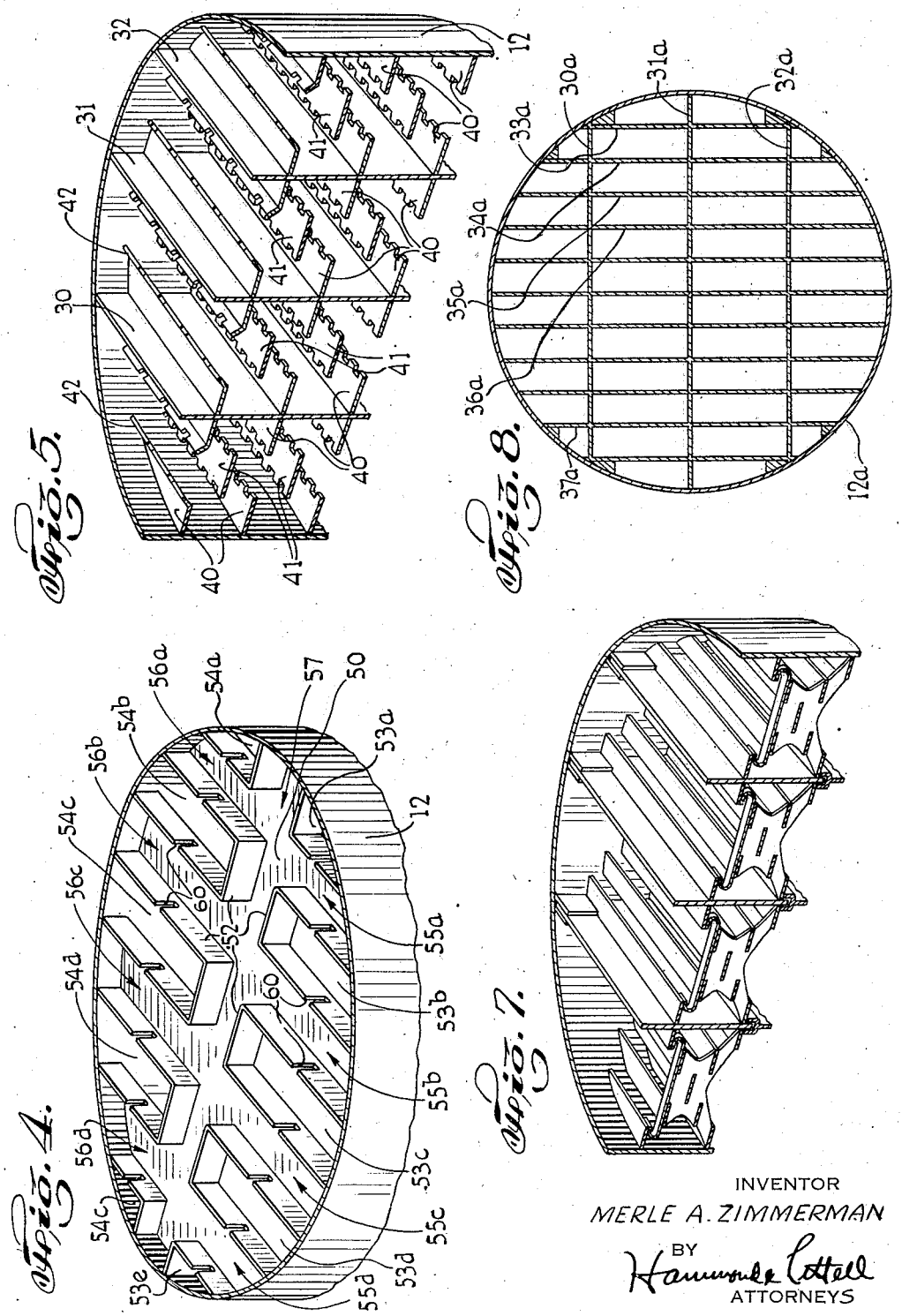
INVENTOR
MERLE A. ZIMMERMAN
BY
ATTORNEYS

UNITED STATES PATENT OFFICE 2,394,133

APPARATUS FOR RECTIFICATION, ABSORPTION, OR GAS SCRUBBING

Merle A. Zimmerman, Elizabeth, N. J.

Application March 8, 1944, Serial No. 525,524

6 Claims. (Cl. 261—110)

This invention relates to new and useful improvements in apparatus for countercurrently contacting streams of rising vapors with streams of downflowing liquid, as in processes of rectification, absorption and gas scrubbing.

So-called "bubble towers" conventionally are used for such processes, but they have several serious limitations. Their diameter must be large to obtain large capacities or thruputs, since only a small proportion of the cross-sectional area of the tower is open for vapor ascension. The tower must be quite high to accomplish efficient rectification, because about four feet of tower height is required per "theoretical deck," i. e. to produce the effect of one redistillation. Furthermore, bubble towers often are unsuitable for high vacuum rectification due to a very large pressure differential between the bottom and the top of the tower. For example, a bubble tower having twenty decks operates with a pressure drop equivalent to about 30 millimeters of mercury from bottom to top, so that if a vacuum equivalent to an absolute pressure of 20 millimeters of mercury is applied at the top, the pressure at the bottom of the tower must be equivalent to about 50 millimeters of mercury. At the latter pressure, however, a relatively high temperature is needed for vaporization, and where the liquid to be rectified is unstable this temperature may be so great as to damage the liquid and prevent it being treated satisfactorily in a bubble tower.

Towers for rectification and the like have been proposed in which a multiplicity of parallel columns are provided to effect intimate contact between a multiplicity of streams of rising vapor and a multiplicity of streams of downflowing liquid. The known forms of such apparatus, however, are objectionably expensive to construct, and they have not provided the capacities and the low pressure drops from bottom to top which are desired in certain types of rectification work.

It is therefore an object of my invention to provide apparatus for rectification, absorption and gas scrubbing which alleviates one or more of the shortcomings of known apparatus as referred to above.

A specific object of my invention is to reduce the cost of the apparatus required for a given job of rectification, absorption or gas scrubbing.

A further object is to provide vapor and liquid contact apparatus for such work which operates with a relatively low pressure differential from bottom to top and thus is especially useful for high vacuum rectification and for the treatment of substances which are sensitive to heat.

Another object of my invention is to provide gas and liquid contact towers for rectification, absorption and gas scrubbing which can be constructed largely from sheet or cast metal or the like, at relatively low cost, and which insure efficient and substantially uniform treatment of all the rising vapors and downflowing liquid passed through the tower.

The apparatus herein disclosed comprises a contact tower for rectification, absorption or gas scrubbing having a multiplicity of parallel columns arranged in contiguous relation so that substantially the entire cross-sectional area of the tower is utilized for gas and liquid contact, together with means in each column for intimately contacting a small stream of rising vapor with a small stream of downflowing liquid, and with means common to the many columns for receiving liquid and distributing it downwardly into the respective columns in streams proportional to the many streams of rising vapors. A shell, which preferably is cylindrical, forms the body of the tower, and the many columns in it are defined by a plurality of intersecting vertical partitions, made of sheet metal or the like, which extend across the shell.

Some of the partitions preferably are arranged in parallel spaced relation so as to intersect with one or more others arranged at an angle. It results that the columns defined between the partitions and the shell are generally rectangular in cross-section, but in many cases have an arcuate side, and that the cross-sectional areas of the respective columns are not uniform. Some are larger or smaller in cross-section than others, so that the quantities of rising vapor accommodated by the respective columns are not uniform.

Nevertheless, the treatment of vapors and liquid in the tower is kept substantially uniform by the provision of means for distributing liquid downwardly into the many columns in non-uniform quantities proportioned relatively to each other approximately as are the quantities of rising vapor accommodated by the respective columns.

The entire tower preferably includes a series of contact sections in vertically spaced relation to each other, each of which embodies an arrangement of many columns as described above, and above and below each contact section there is a tower chamber in which vapors and liquids may unite before being distributed into the many columns of the next contact section to which they respectively flow. A liquid distributing device of the type described is provided in the chamber above each section so as to collect liquid delivered thereto from above and then redistribute this liquid into the many columns of the contact section next below in streams proportional to the respective streams of vapor ascending through these columns.

Within each column means are provided to effect such intimate contact between the rising vapors and thin films of the downflowing liquid passing therethrough that a high degree of rectification may be obtained in a relatively small vertical space, or tower height. Furthermore, the contact means in my preferred embodiments are so designed as to leave a large proportion of the total cross-sectional area of the tower open for the passage of rising vapors, so that a relatively large vapor capacity is obtained and a relatively small pressure drop occurs from the bottom to the top of the tower.

A further feature of my apparatus is the provision of means for introducing a feed or charge liquid into the tower at a point intermediate the top and bottom thereof, between two adjacent contact sections, together with a feed plate inside the tower which delivers this liquid into one of the distributing devices and yet allows the free ascension of vapors through the tower.

Provisions also are made for withdrawing an intermediate product or side stream from the tower at a point between the bottom and the top thereof, for which purpose an appropriate liquid distributing device of the type described may be formed with a sump to hold a body of liquid, and a conduit may be arranged in communication with this sump to draw a side stream out of the tower.

The foregoing and other desirable objects, features and advantages of my invention will become more apparent from the following detailed description of an illustrative embodiment. The detailed description refers to the accompanying drawings which form a part hereof and in which:

Figure 1 shows diagrammatically an assembly of apparatus embodying the invention, as designed for rectification. The tower itself appears in longitudinal section, as viewed approximately along line 1—1 of Figure 2.

Figure 2 is a horizontal section through the rectifying tower, along line 2—2 of Figure 1, showing in plan one of the liquid distributing devices.

Figure 3 is a horizontal section along line 3—3 of Figure 1, showing an assembly of contiguous contact columns and contact baffles therein, as viewed from above one of the contact sections.

Figure 4 is a perspective view of a typical liquid distributing device within a portion of the tower shell.

Figure 5 is a perspective view showing a suitable arrangement of contact baffles within a series of parallel columns constituting a portion of one of the contact sections.

Figure 6 is a fragmentary vertical cross-section along line 6—6 of Figure 1, showing a detail of one of the distributing devices.

Figure 7 is a view similar to Figure 5 showing an alternative arrangement of contact baffles within the column.

Figure 8 is a diagrammatic sectional view through a multi-column contact section suitable for a rectifying tower of relatively large diameter.

Figures 1 to 6, inclusive, illustrate an installation embodying a relatively small tower, say about four feet in diameter, as designed for the rectification of substances such as hydrocarbons, organic liquid, etc. The tower 10 (Figure 1) is formed by an upright cylindrical shell 12 having top and bottom end closures 13 and 14, respectively. Within the shell are three vertically spaced contact sections 16, 18 and 20, which are separated from each other and from the end closures 13 and 14 by chambers 22, 23, 24 and 25. More or less than three contact sections may be provided if desired.

Each contact section comprises a multiplicity of parallel, contiguous columns having means therein for intimately contacting a multiplicity of small streams of rising vapors with a multiplicity of small streams of downflowing liquid. The columns are open at their lower ends, so that rising vapors become distributed into them in a multiplicity of small streams as the vapors ascend from the chambers below the respective sections.

In the chambers above the respective sections liquid distributing devices 16a, 18a and 20a span the cross-section of the tower. Liquid delivered to these devices from above is distributed by each device into many small streams which flow downwardly into the many individual columns of the contact section next below. The distributing devices also have openings which allow the free ascension of vapors through the tower, all as described more particularly hereinafter.

The charging stock to be rectified may be delivered by a pump A through a heat exchanger B which preheats and partially vaporizes the liquid and then charges it into the tower at some point between the top and bottom of the tower, say into chamber 23, where the composition of the downflowing liquid will be similar to the composition of the unvaporized portion of the charge.

At the bottom of the tower an outlet C equipped with a pump D is provided to draw off a bottom product, part of which may be recovered as such through pipe E and the remainder of which may be passed to a reboiler F and reboiled from the latter back into chamber 22, at the base of the tower, through pipe G.

Vapors which arrive at the top of the tower may be withdrawn through pipe H and carried to a condenser J, to be condensed and then collected in a receiver K. Part of this condensate may be withdrawn from the receiver through pump L and pipe M as an overhead product. Another part may be returned through pipe N to chamber 25, where it is delivered through a perforated pipe 26 into distributing device 20a for distribution by the latter, as reflux or downflowing liquid, into the columns of contact section 20.

The illustrated assembly also embodies means for withdrawing a side stream of liquid from a suitable location in the tower and for stripping this side stream with steam to obtain a special intermediate product. For example, the bottom of device 18a may be formed with a depressed channel or sump 28 (Figure 6) to hold a body of liquid, and this sump may communicate with a draw-off line P which leads to a steam stripping unit Q of known construction. The vapors from the stripping unit may be reintroduced into chamber 24 through an inlet R, while the desired intermediate product may be recovered through line S.

Figure 3 illustrates a suitable manner of constructing each contact section with a multiplicity of parallel, contiguous contact columns. Three vertical partitions 30, 31 and 32 extend across and are joined to the shell 10 in parallel spaced relation, dividing the cross-sectional area into four parallel zones of approximately equal width at their widest points. Another partition 35 extends diametrically across the shell at right angles to the other three, so that the several intersecting partitions and the shell, in this form, define eight distinct columns in which to effect countercurrent contact between as many distinct streams of rising vapors and downflowing liquid. It will be understood that other spaced partitions may be provided parallel to partition 35 in order to multiply the number of columns, and that various angular relationships between the partitions may be employed. It also will be apparent that the partitions may each be a unitary sheet of metal or other suitable rigid material, or that smaller pieces of suitable sheet material may be welded or otherwise joined together to accomplish the same effect.

Figure 8 illustrates an arrangement of partitions defining columns such as may be employed in a tower of relatively large diameter, say about 12 feet. In this form, three partitions 30a, 31a and 32a extend across the shell 12a in one direction, and eleven other partitions 33a, 34a, 35a, 36a and 37a, etc. extend across the shell in a crosswise direction. The former partitions may be welded in place, while the latter preferably are castings held removable in the surrounding shell. The cross-sectional area of the tower shell thus accommodates as many as forty-four parallel contact columns in which to rectify as many distinct streams of rising vapors and downflowing liquid.

It has been mentioned that each of the many columns in each contact section is provided with means for intimately contacting the vapors and liquid passed countercurrently therethrough. Various known expedients may be used for this purpose, for example, packings such as Raschig rings, Berl saddles, wire spirals, or the like; but I prefer to use splash baffles or decks, of sheet metal or the like, in a cascade or stair-like arrangement within each column. The arrangements illustrated in Figures 1 and 5 and Figure 7 not only give an exceedingly efficient and uniform scrubbing action between the many vapor and liquid streams, but they also keep a large proportion of the cross-sectional area of the tower open for the free ascension of vapors in large volume, which causes a low pressure differential to exist between the bottom and the top of the tower.

In the form of Figures 1 and 5, many narrow strips 40 of sheet metal extend horizontally, in vertically spaced relation, along the partitions 30, 31 and 32 and parts of the tower shell within each contact section. These baffles project into the contact columns from opposite sides but leave space in each column for the ascension of vapors. In addition, tiers of vertically spaced strips or baffles 41 extend medially across the columns in vertically spaced relation to each other and to the strips 40. Liquid received in the top of each column thus falls from baffles 40 to a baffle 41, then from baffle 41 to lower baffles 40, and so on, while vapors rising into the column pass between the lowermost baffles 40, then around a baffle 41, between higher baffles 40, and so on, in forced intimate contact, many times repeated, with the downflowing liquid. A sawtooth weir effect may be obtained, if desired, by serrating the edges of the several baffles, as indicated in Figure 5.

The uppermost baffles 40 of each contact section may be formed with upstanding flanges 42 to maintain pools of liquid on these baffles, which further distribute the downflowing liquid.

The arrangement of Figures 1 and 5 leaves up to half of the total cross-sectional area of each column open for the free passage of rising vapors through the tower. The alternative arrangement of Figure 7 employs baffles to obtain a stair-like or cascade effect like that produced according to Figures 1 and 5, but in Figure 7 a larger number of baffles of smaller width is used so that there is a larger number of steps in the cascade. In this arrangement up to two-thirds of the total cross-sectional area of each column is open for the free passage of rising vapors.

Referring again to the multiplicity of columns in each contact section, it will be noted that in Figures 1 and 3, and in Figure 8 as well, the several intersecting partitions and the surrounding tower shell define columns which are not uniform in cross-sectional area. The cross-sectional areas of some of the columns are greater than the areas of others, and in consequence the quantities of vapor which will enter and pass through the several columns of each section are not uniform but generally will differ in proportion to the relative cross-sectional areas of the columns. Under ordinary circumstances such a condition would be impractical because it would result in some of the vapor streams undergoing much more or much less rectification, or scrubbing contact with downflowing liquid, than others. This in turn would lower efficiency and the quality of the products recovered.

I maintain efficient and substantially uniform treatments throughout the tower, notwithstanding these nonuniformities, by means of the liquid distributing devices 16a, 18a and 20a, which serve to distribute downflowing liquids into the many columns of the underlying contact sections in quantities approximately proportionate to the streams of rising vapors accommodated by the respective columns. In this way the ratio of downflowing liquid to rising vapor in each column of a certain contact section is made approximately the same as in every other column of that section, so that substantially uniform rectification is assured. Furthermore, if any nonuniformity inadvertently should exist in a column of one section, its effect upon the recovered products is minimized by the commingling and redistribution of vapors and liquids in chambers 23 and 24 and distributing devices 16a and 18a as the vapors and liquids traverse the length of the tower.

A suitable construction for the liquid distributing devices appears in Figures 2 and 4. The device 20a as there shown has a circular outline dimensioned to fit the interior of shell 12. It is made with a bottom 50 in the form of a central panel or web from which spaced webs extend laterally on both sides, and with vertical flanges or walls 52 which extend along the margins of all the webs to the interior of the tower shell. The webs thus define one series of parallel openings or vapor risers 53a, 53b, etc., disposed horizontally across half of the cross-sectional area of the tower, and also a second parallel series of similar openings 54a, 54b, etc., across the other half. The webs with the flanges and shell 12 also define two series of liquid-receiving channels, denoted as 55a, 55b, etc., and 56a, 56b, etc., which communicate with a common cross channel 57, and which are complementary to the several openings or vapor risers.

It will be seen that the lateral channels of the distributing devices are arranged to overlie the respective columns of each contact section. The flanges or sides 52 of these channels thus accommodate means through which to distribute liquid accumulated in the device downwardly in small streams into the respective columns.

The liquid is so distributed in quantities proportional to the quantities of vapors rising through the respective columns; for example, through one or more vertical slots 60 in the flanges 52 above each column. The slots preferably are made deep and narrow so as to be largely submerged in liquid held in the channels. This maintains relatively uniform flow rates through the many slots. The effective cross-sectional area of the slot or slots feeding each of the several columns is designed to have approximately the same ratio to that of the slots feeding any other column of the same section as exists between the cross-sectional areas of the respective columns. In this way the amounts of liquid flowing downwardly into the many columns are kept approximately proportional to the amounts of vapor rising through the columns, and an efficient rectifying action that produces overhead, bottom and intermediate products having sharply defined qualities may be assured.

Where the surfaces resisting vapor ascension are relatively greater in one column than in another, an appropriate adjustment or selection of feed slots for the one column may be made to take account of this factor and thus keep the amounts of rising vapor and downflowing liquid in the desired proportional relationship.

It will be apparent that adjustable slides or gates may be provided on the flanges 52 to adjust or set the cross-sectional areas of the respective feed slots. Such provisions, however, ordinarily are not necessary because slots like those shown or equivalent liquid feed means can be formed as desired when the apparatus is made or installed; and having been once proportioned properly there normally would be no necessity for adjustments during use unless the service of the apparatus should be changed so as to cause a large change in the volume of downflowing liquid.

The several distributing devices 16a, 18a and 20a may be formed substantially alike, but when it is desired to withdraw a side stream from the tower, as described above, the appropriate distributing device, such as device 18a, may have one or more of its cross-webs concaved or depressed downwardly so as to form a deep channel or sump 26 in which to collect a pool of downflowing liquid for withdrawal through a side stream off-take, such as pipe P. A cross-sectional view of the device 18a as so constructed appears in Figure 6 of the drawings.

It has been described that charging stock may be introduced from charge heater B into chamber 23 of tower 10 between the contact sections 16 and 18. The liquid so introduced is received on a feed plate 70 (Figure 1) having openings bordered by upstanding sides or flanges 71 so as to hold some of the charge liquid and deliver the excess over or through the flanges 71 into the channels of distributing device 16a. This distributing device is disposed between plate 70 and the underlying contact section 16. The openings in plate 70 provide ample area for the free ascension of vapors through the tower.

The apparatus herein disclosed is able to perform a certain job of rectification, absorption of gas scrubbing with a tower much smaller in total cross-sectional area than in the case of conventional bubble towers, which for some jobs must be twice as large in such area as my apparatus.

In addition, the efficiency of rectification or the like is greatly increased pursuant hereto, so much so that in some instances approximately one foot of tower height is enough to give the effect of a single redistillation, i. e. to constitute a "theoretical deck," as compared with about four feet of height required in the case of bubble towers. The reductions of diameter and height obtained according to my invention result in very substantial savings of materials and space otherwise required for a certain job of rectification.

The large proportion of cross-sectional area left open for the free ascension of vapors results in a low pressure differential between the bottom and the top of towers constructed pursuant hereto, and this makes my apparatus especially suitable for high vacuum rectification and other work requiring a low vaporization temperature at the bottom of the tower to avoid damage to sensitive liquids undergoing treatment.

The apparatus herein disclosed can be fabricated at a low cost due to the efficient use of almost all the tower area for gas and liquid contact and to the utilization of sheet metal work and simple castings or the like to define the multiple parallel columns and other elements of the various contact sections.

It will be apparent that the present invention may be embodied in various designs of apparatus, without restriction to the details of construction or design set forth hereinabove except as may be required by the prior art or the fair construction of the appended claims. I therefore desire that the invention be accorded a scope fully commensurate with its contributions to the art.

I claim:

1. A tower for countercurrently contacting vapors and liquid comprising a vertical shell having therein a series of vertically spaced contact sections each including a multiplicity of parallel contiguous columns defined by series of intersecting vertical partitions disposed across the shell, each column having means therein for intimately contacting streams of downflowing liquid and rising vapor passed therethrough, a tower chamber above each section common to the columns thereof, and a distributing device spanning the entire cross-sectional area of the shell in each of said chambers to receive and pool liquid delivered thereto from above said device and to distribute such liquid downwardly into the underlying columns of the section below in a multiplicity of streams proportioned to each other and the respective underlying columns approximately as are the free cross-sectional areas of such columns, said distributing device having openings therein for the free ascension of vapors from section to section through the tower.

2. A tower as described in claim 1 wherein the said means in each column comprises a multiplicity of baffles extending substantially horizontally from the partitions part way into each column in a crisscross cascade arrangement to effect intimate contact between streams of down-flowing liquid and rising vapor in each column while keeping a large proportion of the cross-sectional area of each column open to minimize pressure differentials between the bottom and the top of the tower.

3. A tower for countercurrently contacting rising vapors and downflowing liquid comprising a cylindrical shell, a plurality of parallel vertical partitions extending across said shell in spaced relation to each other, at least one vertical partition extending across said shell at an angle to the aforesaid partitions so as to define with the same and said shell a plurality of vertical columns some of which have cross-sectional areas different from others, means within said columns for intimately contacting rising vapors and downflowing liquid passed therethrough, and a distributor tray device above said partitions spanning substantially the entire cross-sectional area of the shell to receive liquid from above and having vertical rectilinear flanges bordering openings in the device for the ascension of vapor therethrough, said flanges having liquid discharge slots extending vertically therein and substantially to the bottoms thereof dimensioned to apportion the liquid downwardly from said device into said columns in a multiplicity of streams proportioned to the respective columns substantially as are the streams of rising vapors accommodated by the respective columns.

4. In a tower for countercurrently contacting rising vapors and downflowing liquid comprising a cylindrical vertical shell having a series of vertically spaced contact sections and a chamber above and below each section, wherein each section includes a multiplicity of parallel contiguous columns having means therein to effect intimate contact between a multiplicity of small streams of rising vapor and a multiplicity of small streams of downflowing liquid passing therethrough, a plurality of intersecting vertical partitions extending across said shell so as to define each of said sections and the columns thereof, and a liquid distributing device extending across said shell in the chamber above each section and formed with channel means to receive and pool streams of liquid delivered thereto from above, with liquid distributing ports formed in said channel means and dimensioned to distribute such liquid into the underlying columns of the section therebelow in quantities proportioned to each other approximately as are the streams of rising vapor accommodated by the respective underlying columns, and with openings bordered by said channel means for passage of such quantities into the tops of said underlying columns and for passing rising vapors freely through the device from said underlying columns.

5. In a tower as described in claim 4, a distributing device intermediate two of said sections having a bottom formed with a trough defining a sump to collect liquid therein, and liquid offtake means extending through said shell in communication with said sump to conduct a side stream of liquid therefrom out of the tower shell.

6. In a tower as described in claim 4, means for feeding liquid to be rectified into said shell at a point between two of said sections, and means extending across said shell at a location below said point and above the distributing device for the section next below for receiving the feed liquid and delivering the same at a multiplicity of points into the channel means of said distributing device, said receiving means having openings therein through which vapors may rise freely in the shell.

MERLE A. ZIMMERMAN.